Patented Feb. 10, 1942

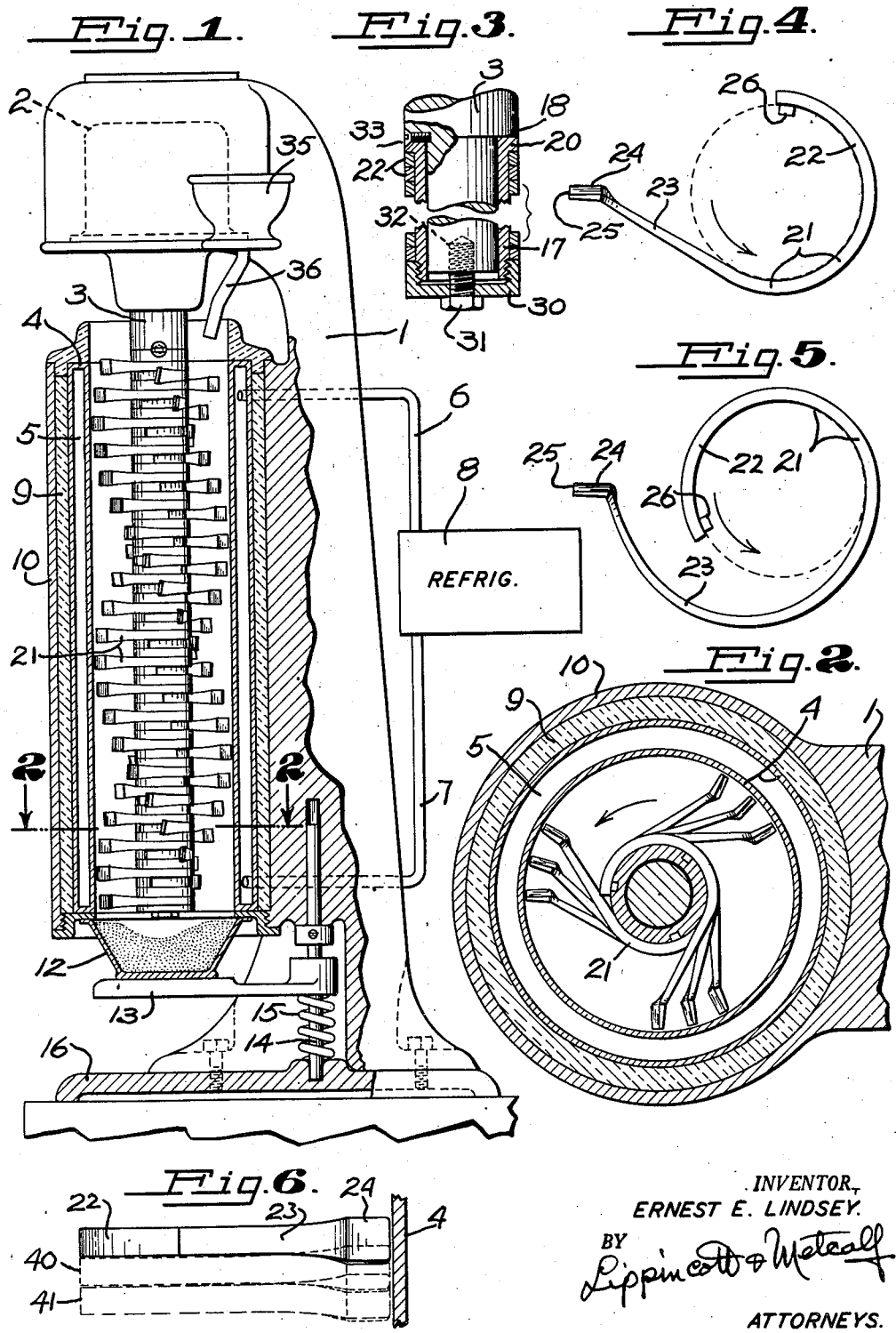

2,272,715

UNITED STATES PATENT OFFICE 2,272,715

MEANS AND METHOD OF FREEZING LIQUIDS

Ernest E. Lindsey, Los Angeles, Calif.

Application July 27, 1940, Serial No. 347,982

10 Claims. (Cl. 62—114)

My invention relates to a means and method of freezing liquids and more particularly to a means and method of freezing and chilling confection mixtures at high speed and with a minimum grain size.

Among the objects of my invention are: To provide a means and method of freezing liquids such as a confection mixture at high speed; to provide a means and method of making frozen confections at high speed and of superior quality; to provide a means and method of quick freezing a confection in individual units; to provide a quick freezing device operating with a minimum of chatter and vibration; to provide a means and method of scraping frozen material from a refrigerated surface with a minimum of chatter and vibration; to provide a means and method of producing a fine grained frozen confection either continuously or in individual units; to provide an improved means and method of applying and removing a liquid material such as a confection mixture, to and from a refrigerated surface.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In the drawing:

Fig. 1 is a longitudinal view partly in section and partly in elevation of a preferred form of my invention.

Fig. 2 is a sectional view taken as indicated by the line 2—2 in Fig. 1.

Fig. 3 is a fragmentary view showing how the blade mechanism is assembled.

Figs. 4 and 5 are plan views of two modifications of resilient scraping blades.

Fig. 6 is a diagram showing how the paths of successive blades overlap.

Referring directly to the figures of the drawing, for a more detailed description of my invention, frame 1 is provided, carrying at the top a motor 2 having a central shaft 3 extending downwardly. Surrounding and concentric with shaft 3 is a hollow cylinder 4, having a space through which a refrigerating fluid may be circulated by pipes 6 and 7 from a refrigeration system 8. Precooled brine may be circulated, or if desired, a volatile liquid may be allowed to expand in space 5, and thus cool the cylinder 4 by abstraction of heat during the expansion of said liquid, as is customary with small refrigeration units. Cylinder 4 is surrounded by a layer of heat insulating material 9, this insulating material being held in place by cylindrical outer cover 10, the latter being attached along the central line to frame 1. At the bottom of cylinder 4 is positioned a confection receptacle 12 mounted on a swinging arm 13, the latter being pivoted on an upright pin 14 so that receptacle 12 may be placed on arm 13 to close the bottom of the cylinder 4, the arm 13 being forced upwardly by spring 15. Frame 1 is preferably supported in a vertical position by a removable base 16.

Motor shaft 3 is provided with an external cylindrical sleeve 17 of substantially shaft length. This sleeve 17 slides over the lower end of the shaft until its upper end abuts shoulder 18 on shaft 3. Sleeve 17 is provided with an upper shoulder 20, and stacked on sleeve 17 are a plurality of beating and scraping blades 21, these scraping blades being preferably made out of strip material of rectangular section. The blades each comprise a curved portion 22, curved over an arc of slightly more than 180° to externally fit sleeve 17, the curved portion then merging into a resilient portion 23 extending away from sleeve 17 toward the inner surface of the cylinder. Each blade terminated in a planar terminal portion 24, having a scraping edge 25. The scraping edge 25 of this terminal portion is adjacent but not touching the cylinder wall, preferred spacing being from .002 to .0010 inch, and the terminal portions 24 are twisted with respect to the remainder of the blade so that the terminal portions are at an angle to the vertical. Each blade is also provided with a retaining boss 26 on the curved portion 22 thereof.

The plurality of blades are mounted on sleeve 17 by providing sleeve 17 with preferably three spiral surface grooves thereon, and stacking blades 21 on the sleeve in staggered relationship, so that every third blade will have lug 26 in the same groove. After all of the blades are stacked on sleeve 17 they are locked in place by applying a pressure nut 30 to the bottom of the sleeve. This pressure nut forces all of the blades upwardly against shoulder 31 of the sleeve and frictionally binds them together into a unit. Sleeve 17 with the blades thereon may then be held on shaft 3 by bolt 32. To insure that no rotation of the sleeve 17 takes place on shaft 3, I prefer to lock sleeve 17 to shaft 3 by a lock screw 33 having threads partly in sleeve 17 and partly in shaft 3.

A convenient way of contouring the blade assembly is to mount sleeve 17, with the beater bars thereon in a lathe, for example, rotate the sleeve, and then make a light grinding cut along the scraping edges 25 thereof, until the scraping edges 25 describe, when rotating, a cylindrical path which is concentric with the inner surface of cylinder 4.

The cylinder wall may be refrigerated to any desired temperature depending upon the hardness of the confection it is desired to deliver to container 12, and with the motor 2 rotating the blade assembly at high speed the confection is poured into funnel 35 running therefrom through delivery pipe 36 into the path of the rotating blades at the top of the cylinder. The material is then very finely broken up by the impact of the blades and is thrown against the refrigerated surface whereon it freezes substantially instantaneously. As soon however, as the layer of frozen material builds up beyond the spacing of the scraping edges from the cylinder wall, the frozen material is immediately scraped off by the scraping edges 25, and is still further finely divided by impact and thrown again onto the cylinder wall for additional freezing. Simultaneously, the planar portions 24 of the blades are directing the material downwardly through the cylinder, aided by gravity, and in a very few seconds, the entire amount of liquid material poured into funnel 35 is delivered to the container 12 as a frozen confection, the consistency of which will depend on freezing temperatures and speed of motor rotation. Irrespective of consistency however, the frozen material will be of exceedingly fine grain due to the intensive beating action taking place during the progression of the material through the cylinder, and due to the fact that the material, after being deposited on the wall to be frozen, is almost instantaneously removed therefrom, thus preventing a formation of ice crystals of any considerable size. It will be obvious however, that there will be formed on the cylinder wall a skin of hard frozen material between the scraping edges 25 and the refrigerated surface, the thickness of this skin being determined of course by the spacing of the scraping edges from the cylinder walls. Once built up this skin does not enter into subsequent material during freezing thereof and provides a freezing surface exactly registering with the scraping edges.

I have found that by the use of a resilient coupling between the scraping edges 25 and the motor shaft 3 that the machine operates exceptionally quietly, and that there is substantially no chatter as is bound to occur when non-resilient blades are used. With non-resilient blades, scraping resistance tends to distort the shaft, and to build up highly undesirable chatter and vibration within the device, possibly due to the whip of the relatively long shaft 3. The provision of the resilient portions 23, which couple the scraping edges 25 to the shaft 3, has entirely eliminated such chatter, and has made a machine in which the shaft 3 runs true, and practically vibration-free within the cylinder during the freezing, scraping and beating of the material. This chatter elimination gives a much longer life to the machine and greatly reduces noise.

I prefer that the resilient blades depart tangentially from the central driving shaft 3, and that the non-radial extension of the resilient blade be in the opposite direction to the rotation of the driving member. The resilient blade portion 23 may be straight, as shown in Fig. 4 or in the modification shown in Fig. 5, the resilient portion 23 may be curvilinear. Consequently, I do not wish to be limited to any particular contour or design of the resilient portions 23, the only requirement being that the scraping edges 25 be resiliently coupled with the driving member.

It will also be noted by reference to Fig. 6 that I have expanded the vertical dimensions of the flat terminal portions 24 carrying the scraping edges 25. This is done for two reasons. I increase the length of the scraping edges so that their paths overlap as shown in Fig. 6, by broken lines 40 and 41, these lines representing the positions, with respect to a point on the cylindrical surface, taken by three vertically adjacent blades during rotation. Thus all portions of the cylinder wall will surely be scraped, preventing any accumulation of frozen material thereon. The use of the expanded portions 24 also provides efficient propeller action of the expanded portions 24 to force the material to the lower end of the device without unduly enlarging the section of the resilient portions, which of course, should be kept small so that frozen material will not accumulate thereon.

Thus it will be seen that I have provided a confection freezer, adapted to freeze liquids by repeated application to a refrigerated surface, and repeated removal therefrom with intermediate beating, which efficiently scrapes frozen material from a refrigerated surface without chatter, and with almost complete elimination of vibration, due to the fact that the scraping edges are resiliently coupled with the driving member.

I claim:

1. In a device for freezing liquid material, a cylinder having a smooth inner surface, said surface being adapted to be cooled below the freezing point of said liquid, means for introducing said liquid into the interior of said cylinder, and rotating means operating on said material while in said cylinder, said rotating means including a plurality of resilient blades separately and serially attached to said rotating means and extending toward said surface in a rearwardly tangential direction with respect to the direction of rotation of said rotating means, and terminating adjacent but not touching said surface.

2. Apparatus in accordance with claim 1 wherein said blades are attached to said rotating means in staggered relationship.

3. Apparatus in accordance with claim 1 wherein said blades are attached to said rotating means in staggered relationship, and wherein said resilient blades are provided with terminal portions enlarged to provide overlapping paths over said surface.

4. Apparatus in accordance with claim 1 wherein said blades are attached to said rotating means in staggered relationship, and wherein said resilient blades are provided with terminal portions enlarged to provide overlapping paths over said surface, said terminal portions being planar and angularly positioned with respect to the axis of said cylinder.

5. Apparatus in accordance with claim 1 wherein said rotating means is coaxially positioned in said cylinder, and wherein said resilient blades extend both tangentially and curvilinearly toward said cylindrical surface, the curvature thereof being convex in the direction of rotation.

6. Apparatus in accordance with claim 1 wherein said rotating means is coaxially positioned in said cylinder and wherein each of said blades has a portion fitting said rotating means and a free resilient portion extending toward said surface.

7. Apparatus in accordance with claim 1 wherein said rotating means is coaxially positioned in said cylinder and wherein each of said blades has a portion fitting said rotating means over an arc of greater than 180° and a free resilient portion extending toward said surface, said blades being stacked on said rotating means and held thereon by means longitudinally compressing said stack.

8. Apparatus in accordance with claim 1 wherein said cylinder and rotating means are coaxial and vertically positioned and wherein said material moves through said cylinder by gravity while being acted upon by said blades, said blades being resilient only in horizontal planes.

9. Apparatus in accordance with claim 1 wherein said cylinder and rotating means are coaxial and vertically positioned and wherein said material moves through said cylinder by gravity while being acted upon by said blades, said resilient blades being preformed of strip material.

10. The method of removing frozen material from a refrigerated surface without substantial chatter which comprises moving a scraping edge through said frozen material at high speed without touching said surface and resiliently coupling said edge to the source of power moving said edge.

ERNEST E. LINDSEY.